US012722342B1

(12) United States Patent
Woods

(10) Patent No.: US 12,722,342 B1

(45) **Date of Patent: *Sep. 1, 2026**

(54) APPARATUS FOR THE FABRICATION OF STRAND-EMBEDDED STRUCTURES AND BARE LEADS

(71) Applicant: Mainstream Engineering Corporation, Rockledge, FL (US)

(72) Inventor: Benjamin S. Woods, Melbourne, FL (US)

(73) Assignee: Mainstream Engineering Corporation, Rockledge, FL (US)

( * ) Notice: Subject to any disclaimer, the term of this patent is extended or adjusted under 35 U.S.C. 154(b) by 90 days.

This patent is subject to a terminal disclaimer.

(21) Appl. No.: 18/915,634

(22) Filed: Oct. 15, 2024

Related U.S. Application Data

(63) Continuation-in-part of application No. 18/177,819, filed on Mar. 3, 2023, now Pat. No. 12,327,657.

(51) Int. Cl.
*B29C 64/209* (2017.01)
*B33Y 30/00* (2015.01)

(52) U.S. Cl.
CPC ............ *B29C 64/209* (2017.08); *B33Y 30/00* (2014.12)

(58) Field of Classification Search
CPC .............................. H01B 13/004; B22F 12/57
See application file for complete search history.

(56) References Cited

U.S. PATENT DOCUMENTS

| | | | | |
|---|---|---|---|---|
| 11,292,192 | B2 | 4/2022 | Stranberg et al. | |
| 12,327,657 | B1 * | 6/2025 | Woods | H01B 13/14 |
| 2020/0156318 | A1 * | 5/2020 | Stranberg | B29C 64/106 |

* cited by examiner

*Primary Examiner* — Virak Nguon

(74) *Attorney, Agent, or Firm* — Michael W. O'Neill, Esq.

(57) ABSTRACT

An apparatus for the extrusion of a solid strand into a matrix material is disclosed. The apparatus consists of two main parts including an adapter for constraining the strand until mixing with the matrix ('strand injector'), and a motor-driven gear system that feeds the strand into the injector ('strand extruder'). With this system, a bare strand can be extruded allowing for the creation of lead-in/lead-out sections, or for use with a matrix without an inherent curing, drying, or solidifying mechanism. Additionally, this apparatus allows for the extrusion of small (0.003-0.01" diameter) strands, enabling unique applications such as the injection of a resistive strand where smaller diameter strands are advantageous for minimized electrical or thermal overhead.

7 Claims, 15 Drawing Sheets

APPARATUS FOR THE FABRICATION OF STRAND-EMBEDDED STRUCTURES AND BARE LEADS

CROSS-REFERENCE TO RELATED APPLICATIONS

This application is a continuation-in-part of U.S. patent application Ser. No. 18/177,819, filed Mar. 3, 2023, which is currently pending, which is incorporated by reference herein in its entirety.

STATEMENT REGARDING FEDERALLY SPONSORED RESEARCH OR DEVELOPMENT

This invention was made with government support under 80NSSC22PB082 awarded by National Aeronautics and Space Administration. The government has certain rights in the invention.

This application is related to currently pending U.S. patent application Ser. No. 18/884,227, filed Sep. 13, 2024, titled APPARATUS FOR THE FABRICATION OF STRAND-EMBEDDED STRUCTURE WITH BARE LEADS, U.S. patent application Ser. No. 18/177,848, filed Mar. 3, 2023, titled PROCESS FOR FABRICATING WIRE-EMBEDDED ZEOLITE STRUCTURES WITH BARE WIRE LEADS, and U.S. patent application Ser. No. 18/177,836, filed Mar. 3, 2023, titled WIRE-EMBEDDED ZEOLITE STRUCTURES WITH BARE WIRE LEADS, the disclosures of which are hereby incorporated by reference in this application.

BACKGROUND

The present disclosure is directed to enabling the unaided extruding of strands in Additive Manufacturing (3D printing) processes. Particularly, the present disclosure is concerned with using a two-part system of a strand extruder and a strand injector to grip, push, and extrude a strand into a 3D printing matrix material or structure.

In certain applications, it is advantageous to extrude thin (≥30 AWG) wires into a 3D printed structure with or without a printing medium simultaneously extruded. For example, wires for resistive heating elements require bare sections for connection to a power supply. Traditional wire or fiber (collectively, 'strands') feeding mechanisms solely or partially rely on the curing, drying, or solidifying of the printing medium in order for the wire to be extruded, making the extrusion of bare wire sections impossible.

Additionally, in other applications, it may be advantageous to generally embed continuous strands into matrix materials that have no inherent curing, drying, or solidifying mechanism, or having a mechanism that is delayed. These applications may not require bare strand leads/sections, but similarly require a mechanism that is agnostic to the matrix material.

Additionally, it may be advantageous, in some applications, for the strands to be extruded between layers of the printing matrix rather than within the layer. Traditional mechanisms are only capable of extruding a strand within the printing matrix, restricting the strand to being placed directly into that matrix's layer. For the foregoing reasons, there is a need for an apparatus that is capable of extruding thin (0.003"-0.01"+) strands with or without the simultaneous extrusion of a printing matrix with an inherent curing, drying, or solidifying mechanism.

SUMMARY

In an implementation of the invention there are two main parts that together push and constrain a strand from a standard spool to the dispensing tip/nozzle. This system is installed on a matrix extruder, with the two subsystems mounted directly next to each other, or connected by a low-friction tube.

The term matrix may include any type matrix material, including those without inherent curing mechanisms (e.g., ceramic pastes that require post-process firing). Examples include single- or multi-part thermosets, epoxy resins, phenolic resins, esters, urethanes, silicones, ceramic pastes, and more. Further, the matrix may be composed of two different types to provide further enhance the properties of the structure, or provide a secondary function. For example, a silicone can be deposited intermittently with a rigid epoxy resin to provide vibrational damping. The term strand may include any type of continuous strand (e.g., carbon fibers/tows, optical fibers, metallic wires, or others) that is pushed out of the mechanism either during co-extrusion with the matrix, or by itself to create a bare strand section or lead. The strand may serve to reinforce the structure formed by the matrix, or may have a non-structural purpose such as for resistive heating, forming or completing circuits, forming antennas, or others.

The first main part of this system is the strand extruder. The strand being extruded is first fed into a guide in the strand extruder. This guide centers the strand on a motor-driven wheel with chamfers that help center the strand, walls that help prevent the strand from moving off the wheel, and a center groove that grips the strand. A spring-loaded arm is then released, which provides tension against an attached free-spinning bearing that contacts the strand and holds it rigidly against the motor-driven wheel. With the strand constrained and gripped, the motor can be activated which pushes the strand into guide tube that fits closely against the idler bearing and drive wheel; this prevents the strand from getting caught around either the wheel or bearing. This guide tube then guides the strand into a low-friction tube to constrain the strand to the dispensing tip/nozzle.

At the end of tube, the second main part of this system, the strand injector, guides the strand from the tube into the dispensing tip/nozzle. The strand injector has a threaded port for mounting onto a standard matrix extruder, and an optionally threaded port for mounting a push-to-connect or other fitting to constrain the incoming strand's tube.

This system constrains the strand more effectively than existing systems, allowing it to not rely on any sort of curing, solidifying, or drying mechanisms of the printing medium to help pull the strand out of the system.

In a first implementation, an apparatus for the fabrication of a structure formed from a strand embedded matrix with bare strand leads extending beyond the structure is described herein having a motor having a housing with a front cover and the motor having a shaft extending therefrom and the shaft having a motor-connected gear and a tensioner arm attached thereto, the tensioner arm containing an idler bearing, and a tensioner spring in compression between the housing and the tensioner arm; a strand extruder having a pre-extruder guide to center the strand as the strand enters the strand extruder, a drive gear, a drive wheel, and a guide tube, wherein the drive gear is geared to the motor-connected gear, the drive wheel is connected to the drive gear and, wherein after the strand pass through the pre-extruder guide, the drive wheel centers and grips the strand under tension provided by the idler bearing pressing against the wheel and strand, due to the tension spring pressing against the tensioner arm and idler bearing toward the drive wheel, is feed into the guide tube; and a strand injector having separate chambers for the strand and the matrix and a nozzle for dispensing at least one of the strand alone, a combination of the strand and the matrix, and the matrix alone. A further implementation has the drive wheel including a groove, two chamfers, and two sidewalls, wherein the groove is between the two chamfers and the two chamfers are between the two sidewalls. Another implementation further has a tube to carry the strand from the strand extruder to the strand injector. Another implementation further has the strand injector having a centered support running the length of the injector to support the tube within the nozzle and to prevent the matrix from flowing up to the strand extruder. In other implementations, the strand extruder may not have a guide before the strand extruder,

BRIEF DESCRIPTION OF THE DRAWINGS

These and other features, aspects, and advantages of the disclosure will become better understood given the following description, appended claims, and accompanying drawings where:

DESCRIPTION

In the Summary above and the Description, and the claims below, and in the accompany drawings, reference is made to particular features (including method steps) of the implementations with the disclosure. It is to be understood that the disclosure of the implementations in this description include all possible combinations of such particular features. For example, where a particular aspect or embodiment of the implementation, or a particular claim, that feature can also be used, to the extent possible, in combination with and/or in the context of the other particular aspects and implementations of the disclosure, and in the disclosure generally.

Figure 1:
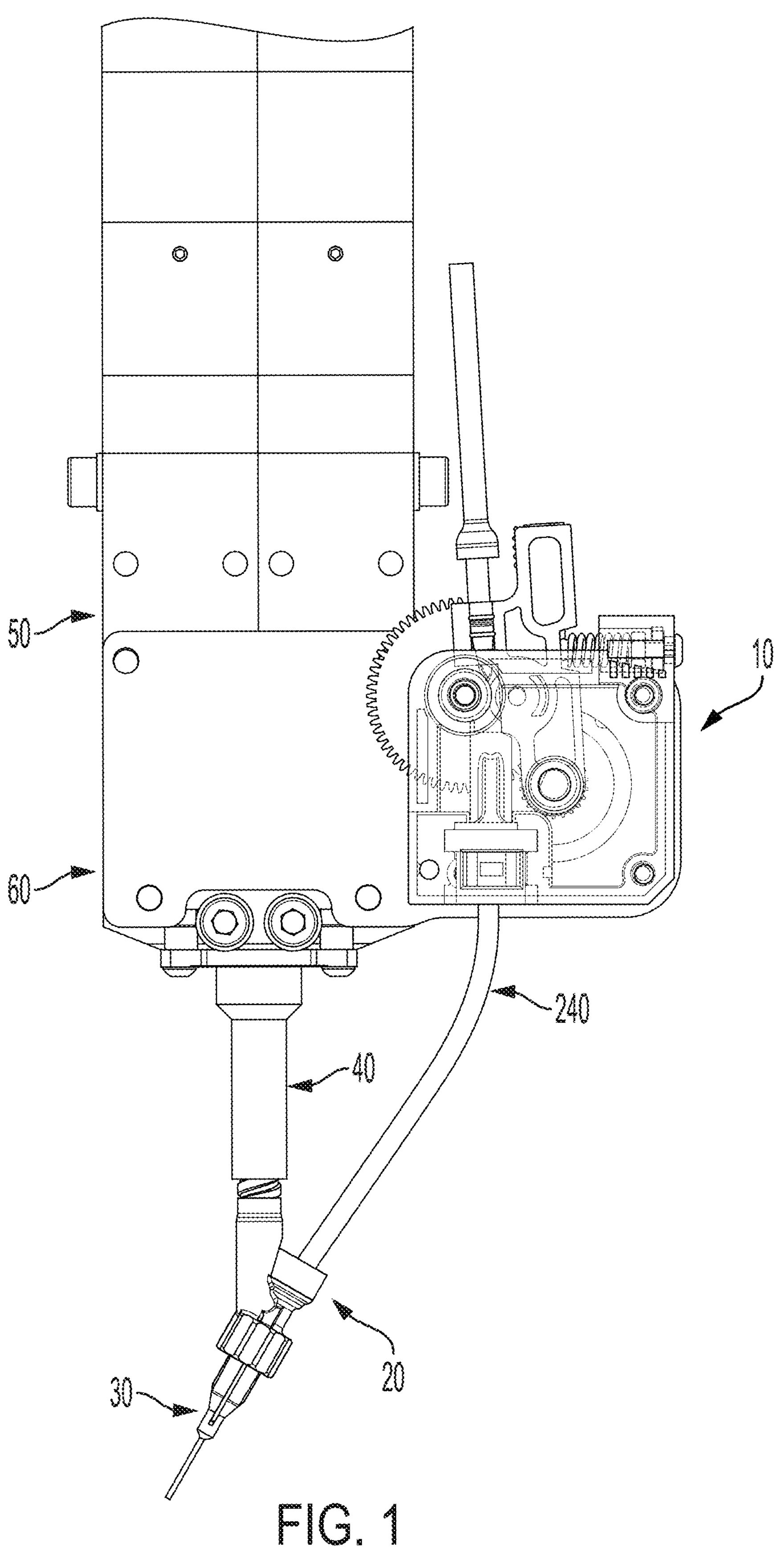
FIG. 1 shows an implementation of the invention installed on a matrix extruder.

FIG. 1 depicts the strand extruder 10 as assembled on a matrix extruder. The matrix extruder is depicted as a dual chamber matrix extruder 50, but the implementation is not affected by the specific type of matrix extruder used. The strand feeding system consists of two main constituents including an adapter for mixing the strand and the matrix ('strand injector') 20, and a motor-driven gear system that feeds the strand into the injector ('strand extruder') 10. The strand extruder 10 is attached at a level above the nozzle 30 with a bracket 60. The strand injector 20 is attached between the outlet 40 of the matrix extruder 50 and the depositing nozzle 30. During operation, the strand being fed can be simultaneously with a matrix, or by itself. This allows for the optional creation of bare strand leads to connect the continuous strand to electrical, thermal, or other sources or circuits; enabling the use of the strand for resistive heating, circuitry, or other active uses.

Figure 2A:
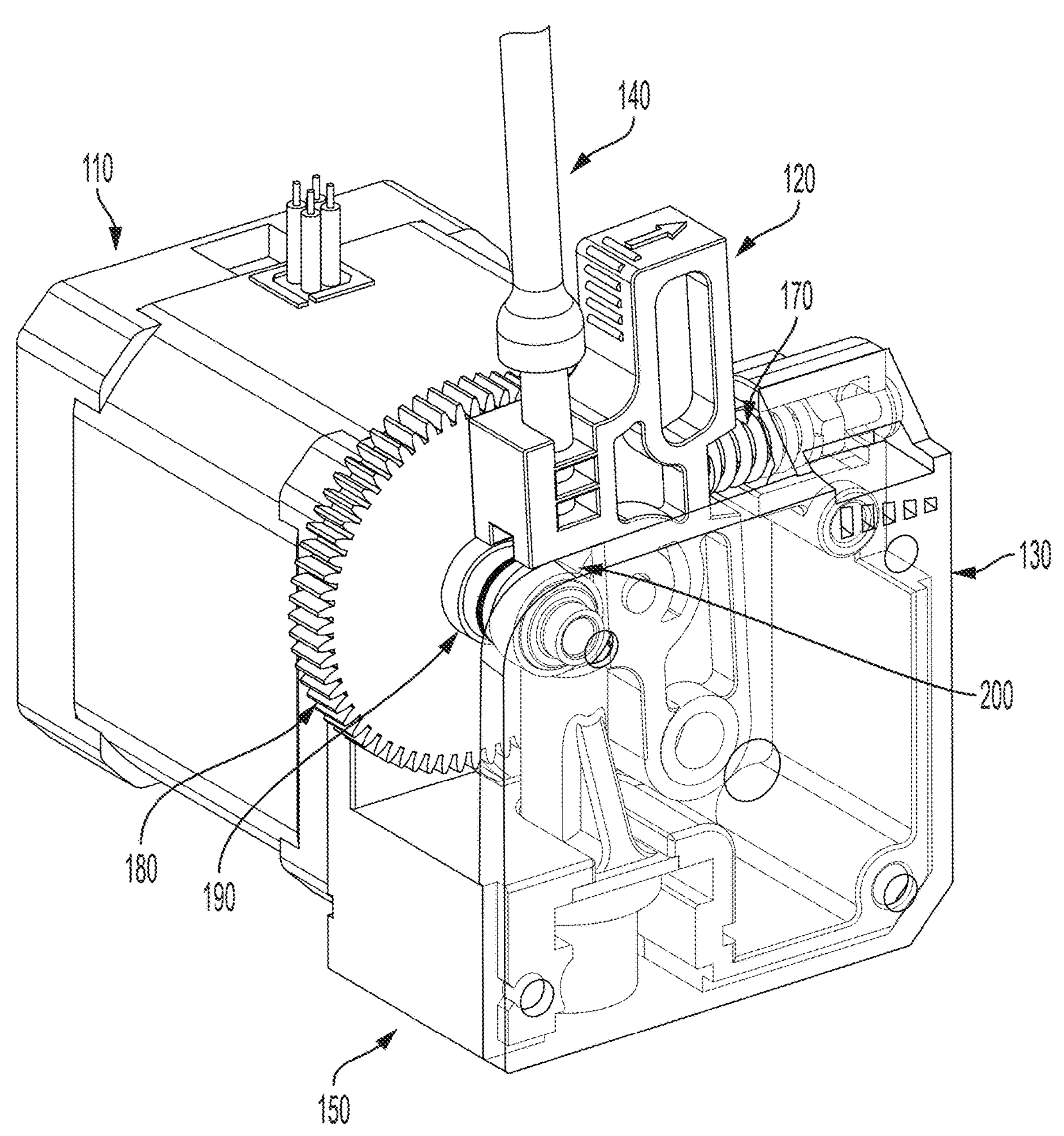
FIG. 2A shows an isometric view of the strand extruder.

FIG. 2A shows an isometric view of the strand extruder 10 attached to stepper motor 110. The stepper motor 110 includes body 150, tensioner arm 120, tensioner spring 170, front cover 130, and idler bearing 200. During operation, the strand is pulled through the pre-extruder guide 140 which centers the strand concentrically with the guide tube 210. The strand extruder 10 grips the strand between the drive wheel 190 and the idler bearing 200. Tension is held against the idler bearing 200 by the tensioner spring 170 pressing against the tensioner arm 120 this helps the drive wheel 190 grip the strand as it rotates.

Figure 2B:
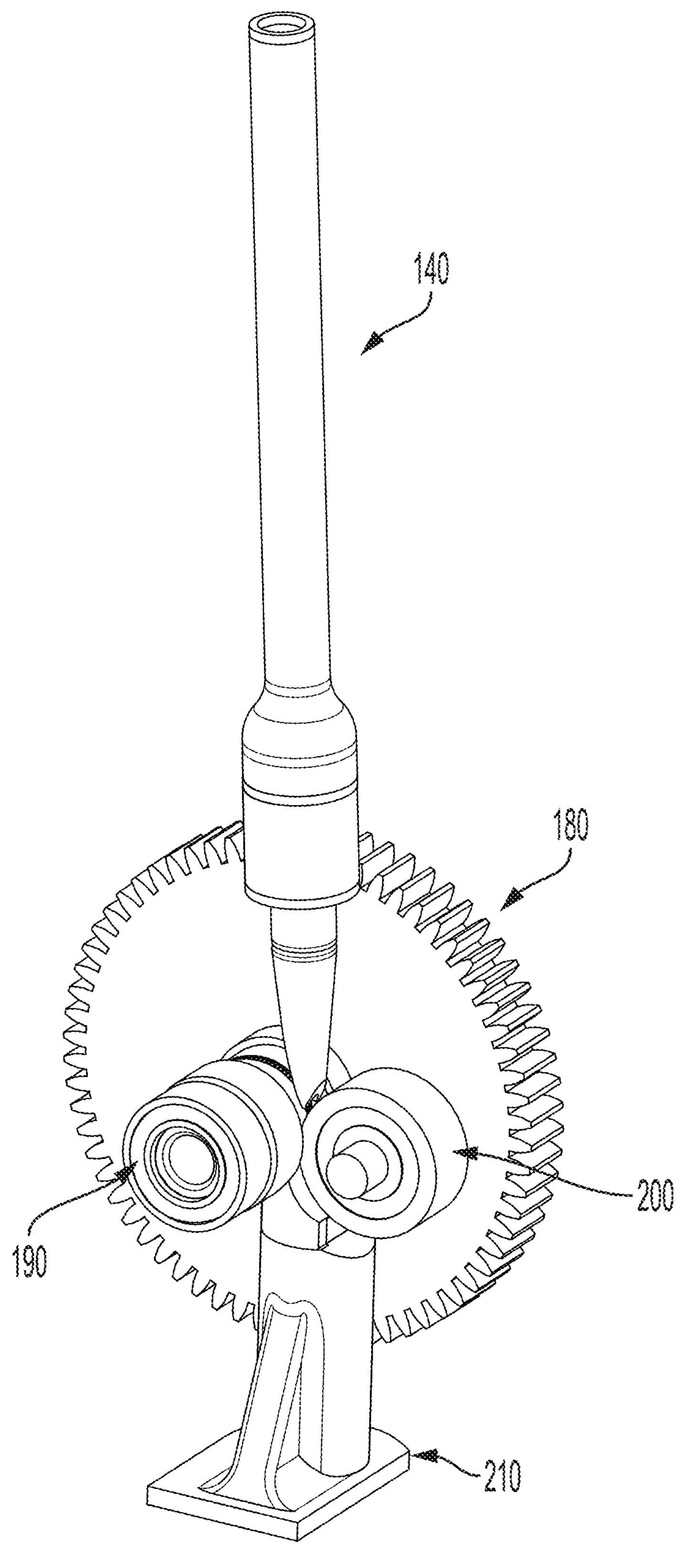
FIG. 2B shows a close-up view of the strand extruder's drive wheel and idler bearing, and pre-extruder guide and guide tube.

FIG. 2B depicts an isolated view of the five of the key components of the strand extruder 10: the pre-extruder guide 140, drive gear 180, drive wheel 190, idler bearing 200, and guide tube 210. These are the key components in the strand extruder 10 that were designed with the sole purpose of extruding thin strands with or without the co-extrusion of a printing material.

Figure 3A:
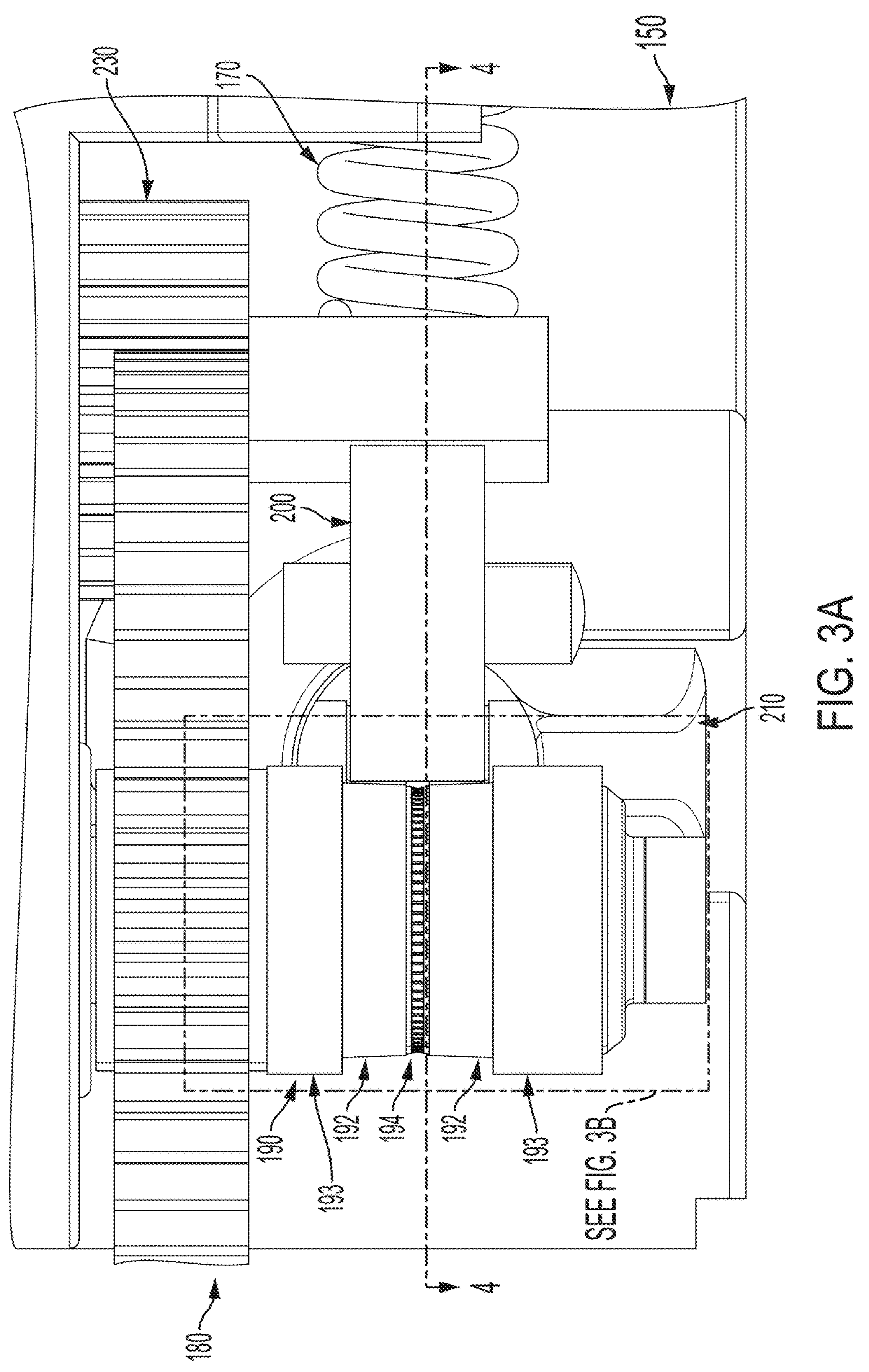
FIG. 3A shows a top view of the strand extruder with the guide tube and tensioner removed.

FIG. 3A shows a top-down view of the strand extruder 10 with the tensioner 120 and pre-extruder guide 140 removed. This view shows the motor-connected gear 230 that is attached to the drive gear 180 that is connected to the drive wheel 190; in operation, the motor 110 is commanded to rotate a set distance, which rotates the drive wheel 190 forcing the strand down and out of the extruder 10. During operation, the strand is centered on the drive wheel 190 by the pre-extruder guide 140.

Figure 3B:
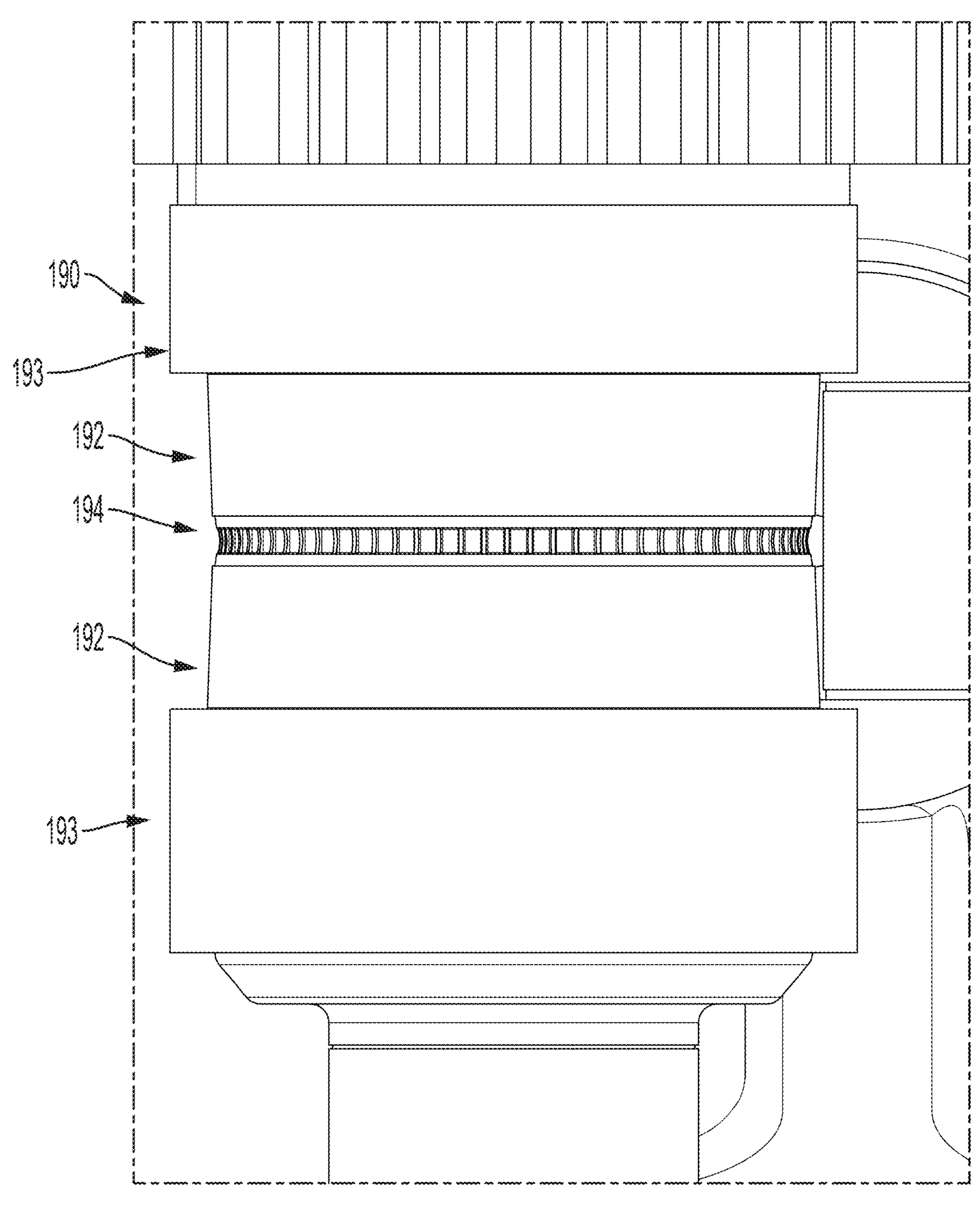
FIG. 3B shows a close-up view of the drive wheel, highlighting the design features that make the extrusion of thin strands possible.

FIG. 3B shows a detailed view of the drive wheel 190. To ensure the strand is kept centered, the drive wheel features two chamfers 192 that help walk the strand to the center groove 194 as the drive wheel 190 is rotated. Additionally, the tension held against the idler bearing 200 acts in conjunction with these chamfers 192 to force the strand to the center groove 194. To ensure proper tension is held against the strand, the high side of the chamfers 192 shall be no more than ¾ of the desired strand's diameter higher than the center groove 194. Further, the center groove 194 shall be no further from the idler bearing 200 than the desired strand's diameter. To prevent the strand from falling between the idler bearing 200 and drive wheel 190, the drive wheel 190 has symmetric walls 193 that overlap the idler bearing 200 with a radial gap no larger than the strand's diameter.

Supposing a strand diameter of 0.004", the chamfer's 192 high edge would need to be no more than 0.003" higher than the center groove so that the idler bearing 200 will still contact and hold tension against the strand. Additionally, the drive wheel's 190 symmetric walls 193 would need to be no further than 0.004" away from the idler bearing 200 on either side; this ensures that if the strand is off center and gets pushed to the high end of the chamfer 192, it cannot slip between the drive wheel's walls 193 and the idler bearing 200. The primarily focus of this apparatus is to extrude strands with a diameter of 0.003"-0.01" with or without the co-extrusion of a printing material. Specifically, the original intent of this design is to fabricate parts with embedded strands with bare strand leads for attachment to a power source for uniform Joule heating of the fabricated part. In this implementation, the desired strand diameter may change based on a variety of factors. For example, suppose you are using a 38-gauge, nickel-chromium 80 wire with a resistance of about 40Ω per foot, and suppose you are printing layers that contain 10 feet of embedded wire. In this instance, your per-layer resistance would be 400Ω, meaning if you needed to apply 1 amp of current to achieve the desired heating rate, your power supply would need to be deliver 400 volts (based on the V=IR relation). Therefore, it may be necessary to modify the wire diameter (and, consequently, the drive wheel 190 features) to balance your available power source with the desired heating rate and layer geometry. Similarly, suppose you are co-extruding a strand such as carbon fiber into a ductile matrix for mechanical reinforcement, the carbon fiber's diameter may need to be altered based on the desired tensile strength of the strand-reinforced matrix structure, or based on the desired road width (i.e., you may want a minimum matrix wall thickness surrounding the carbon fiber to prevent fiber electrification). In this case, the carbon fiber diameter, and, therefore, the drive wheel 190 features, may be altered per layer or per structure.

Figure 4A:
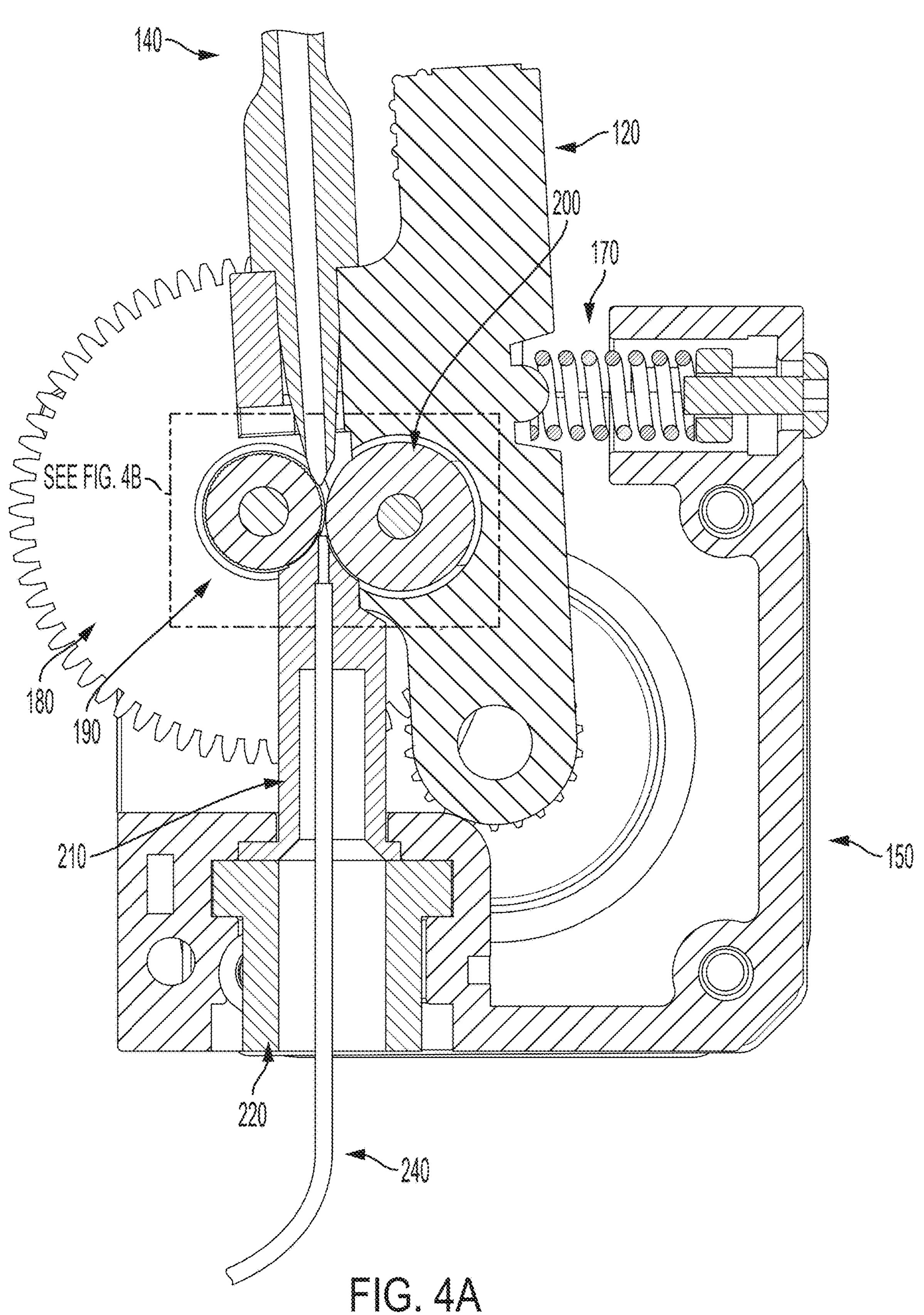
FIG. 4A shows a frontal section view of the strand extruder.

FIG. 4A shows a frontal cut away view of the strand extruder 10. Once the strand is centered on the drive wheel 190 and pushed down, the strand is directed into a guide tube 210 which contains a low-friction tube 240 that constrains the strand to the strand injector 20. The guide tube 210 is held in place by a removable adapter 220 that allows the guide tube 210 to be inserted from the bottom of the strand extruder 10 to clear the two constraining drive wheel walls 196.

Figure 4B:
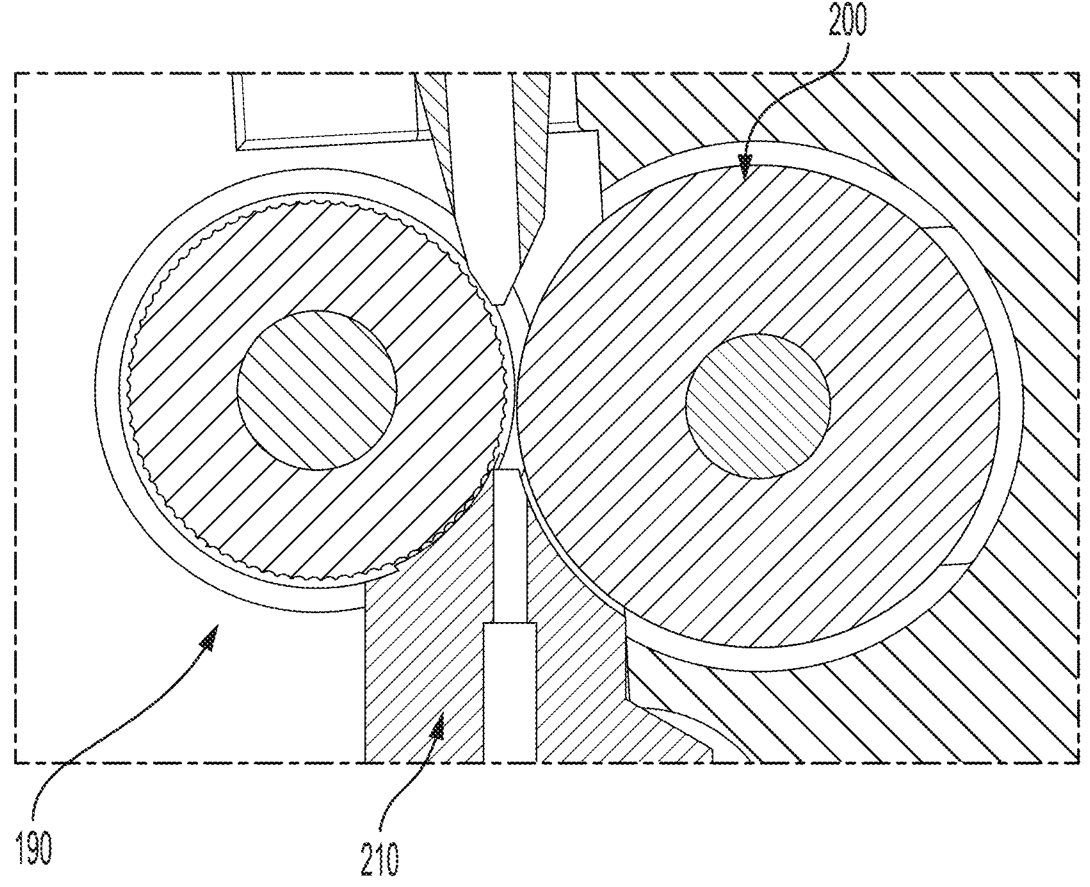
FIG. 4B shows a close up of the drive wheel, idler bearing, and guide tube.

FIG. 4B shows a close up of the drive wheel 190, idler bearing 200, and guide tube 210. The strand will be pushed rigidly by the rotation of the drive wheel 190 and tension held against the idler bearing 200, forcing the strand down through the opening on the guide tube 210. Note that the guide tube's 210 opening is centered under the convergence point between the drive wheel 190 and idler bearing 200 to reduce backpressure on the strand. Additionally, another key design aspect is the close contact between the guide tube 210 and both the drive wheel and idler bearing 200. The drive wheel is in direct contact with the guide tube 210, while the idler bearing is slightly offset from the guide tube 210 (gap no larger than the strand's diameter) to allow the rotation of the tensioner arm 120 (allowing for more than one strand diameter to be accommodate with the apparatus).

As shown in FIGS. 4A and 1, a low friction tube 240 is used to carry the strand from the strand extruder 10 to the strand injector 20 when the two sections are not directly mounted next to each other.

Figure 5:
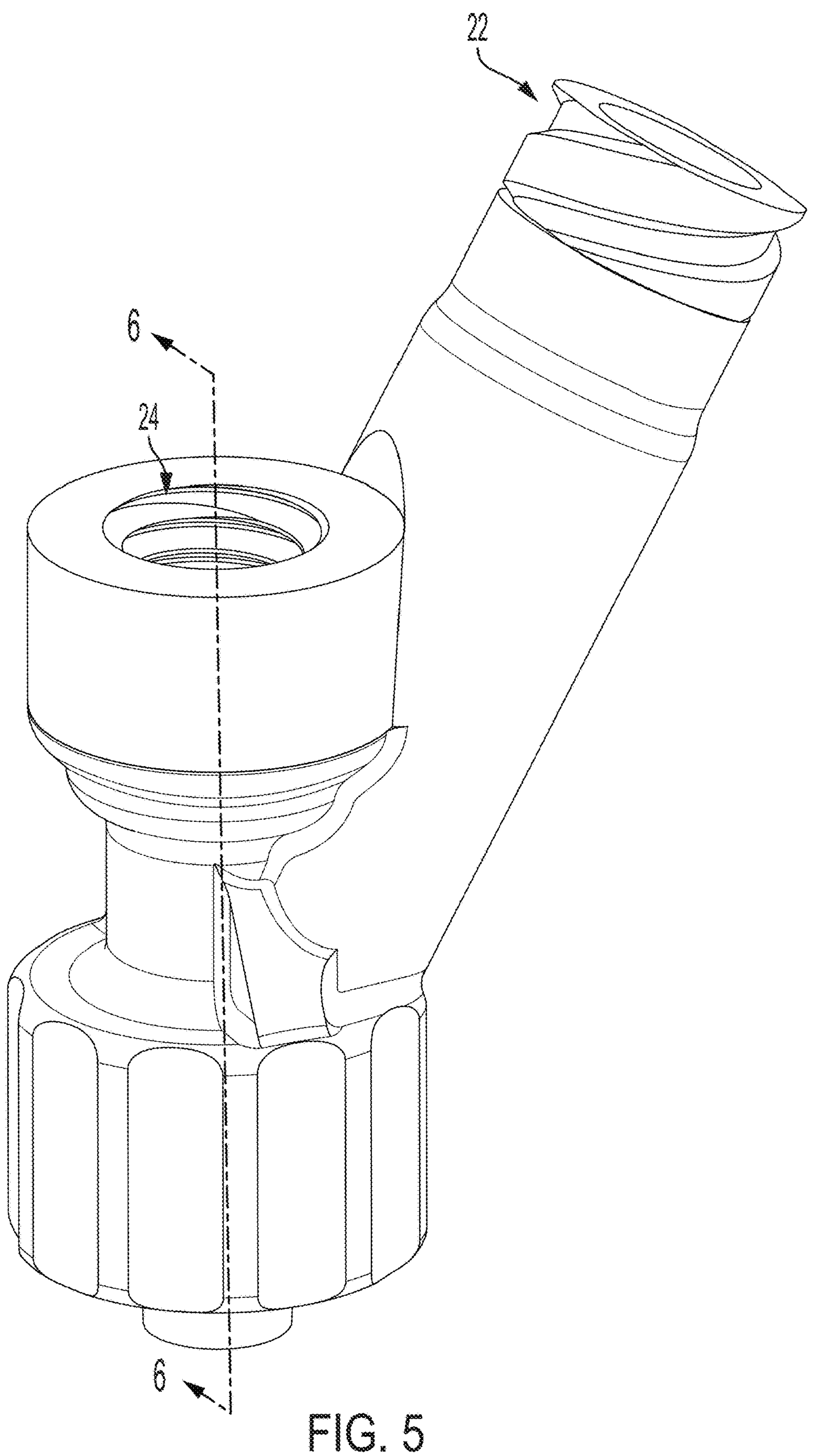
FIG. 5 shows an isometric view of the strand injector.

FIG. 5 shows an isometric strand of the strand injector 20. This piece is used to combine the strand and printing medium (e.g., matrix) if the two are to be extruded simultaneously, or to constrain the strand to the nozzle 30 if the strand is the extruded by itself or with the printing medium. The injector 20 features a thread 22 to connect it to the matrix extruder's 50 mixing tube 40, or directly to the matrix extruder 50 if no mixing tube 40 is used. Additionally, an optional thread 24 on the strand's inlet optionally allows for a push-to-connect fitting to be attached to further constrain the tube 240.

Figure 6:
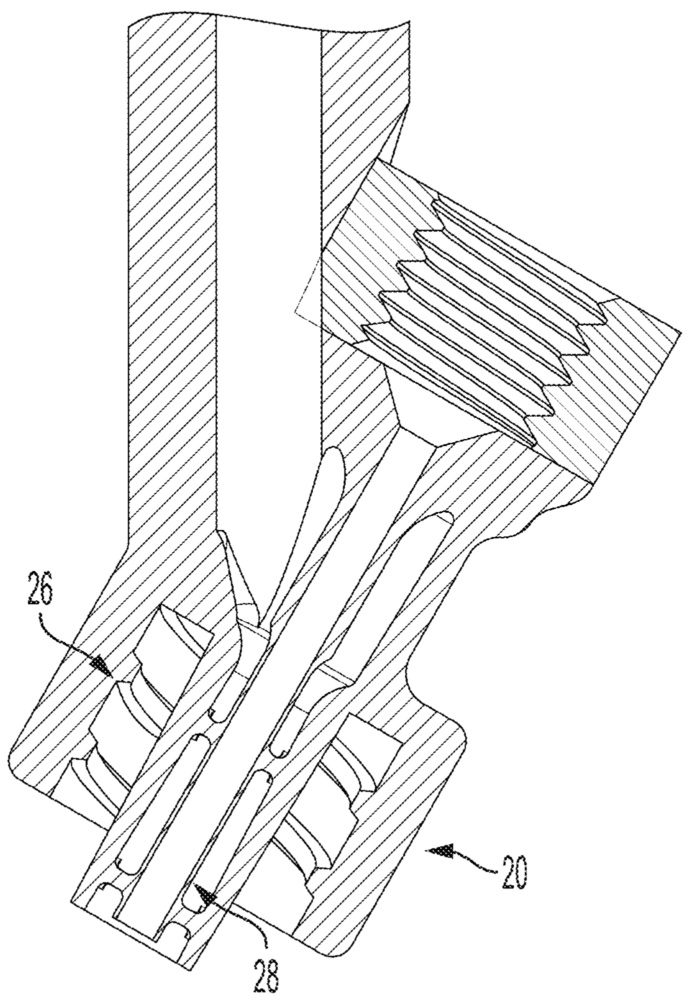
FIG. 6 shows a frontal section view of the strand injector.

FIG. 6 shows a frontal cut away view of the strand injector 20 and nozzle 30. A thread 26 at the bottom of the injector 20 allows for a standard nozzle/dispensing tip 30 to be attached. A centered support 28 runs the length of the injector 20 to support the strand's tube 240 all the way to the nozzle 30, and to prevent the matrix from flowing up the tube 240 to the strand extruder 10.

This strand extruder is designed and tested for use with strand size of ø0.003"-ø0.01". Strand buckling is minimized when the strand's tube 240 is constrained and contains no sharp turns (90° or greater) from the strand extruder 10 to the strand injector 20.

The use of this apparatus is accomplished by feeding a strand into the top of the pre-extruder guide 140. The tensioner arm 120 is then pulled back to allow the strand to pass through the guide tube 210 and into the carrying tube 240. The strand is then pushed through the carrying tube 240 until it emerges from the end. The tensioner arm 120 is then released and the tensioner spring's 170 tension is adjusted until the strand protruding from the carrying tube 240 cannot be pulled by hand. Then, the tube inserted into the strand injector 20 and the nozzle 30 is mounted. Depending on the matrix extruder 50 used, it may be necessary to mount the strand injector 20 before feeding the carrying tube 240 into the strand injector 20.

Figure 7:
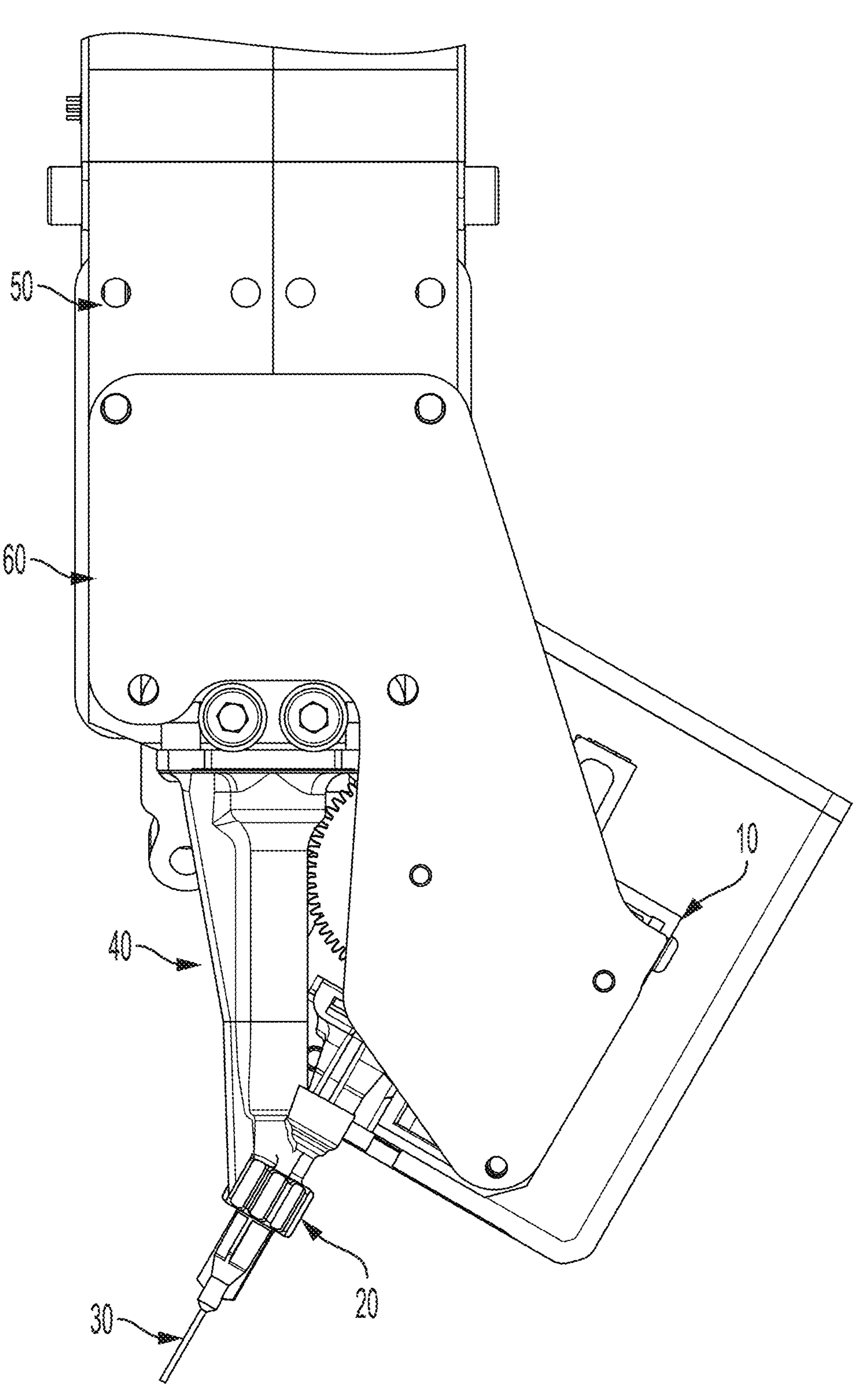
FIG. 7 shows another implementation of the invention installed on a matrix extruder.

In another implementation, the strand extruder 10 is mounted directly on the strand injector 20 without a low-friction tube 240 connecting the two subsystems. In this implementation, the distance between the strand extruder 10 and the nozzle 30 is minimized, reducing failures due to buckling that can occur in the tube 240. This implementation is shown in FIG. 7. In this implementation, the use of this apparatus is accomplished by feeding a strand into the top of the pre-extruder guide 140. The tensioner arm 120 is then pulled back to allow the strand to pass through the guide tube 210 and directly into the strand injector. The tensioner arm 120 is then released and the tensioner spring's 170 tension is adjusted until the strand protruding from the strand injector 20 cannot be pulled by hand. Then, the nozzle 30 is mounted and any protruding strand is trimmed.

The strand extruder 10 assembly may have a tensioner arm 120 that has a centering guide 125 that guides and centers the strand onto the drive wheel 190; eliminating the need for a separate pre-extruder guide 140. In this implementation, the use of this apparatus is the same as prior implementations, with the exception of feeding the strand through the tensioner arm's centering guide 125 instead of feeding the strand through a pre-extruder guide 140. This implementation is shown in FIG. 8A.

Figure 8A:
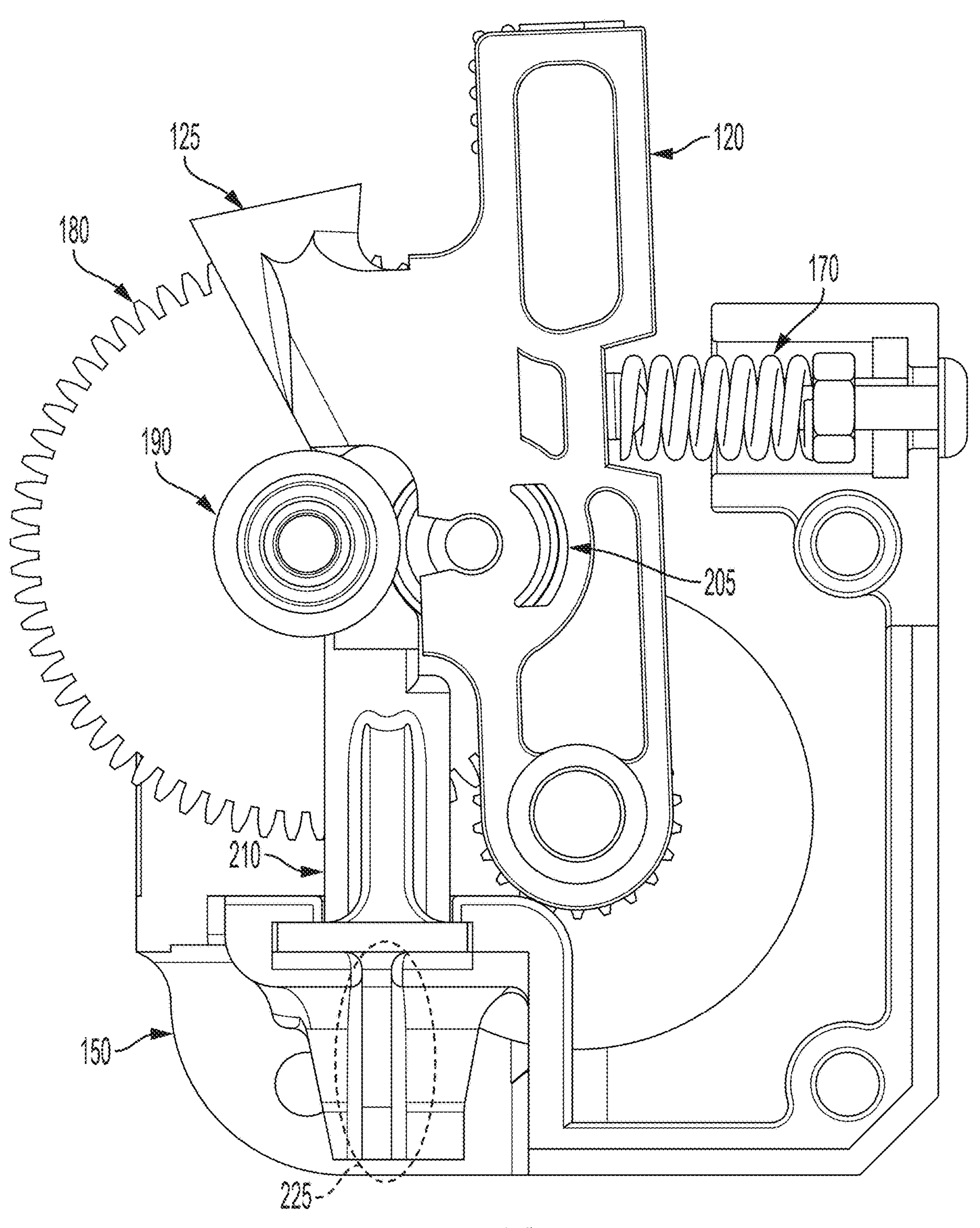
FIG. 8A shows a frontal view of this other implementation of the strand extruder.
Figure 8B:
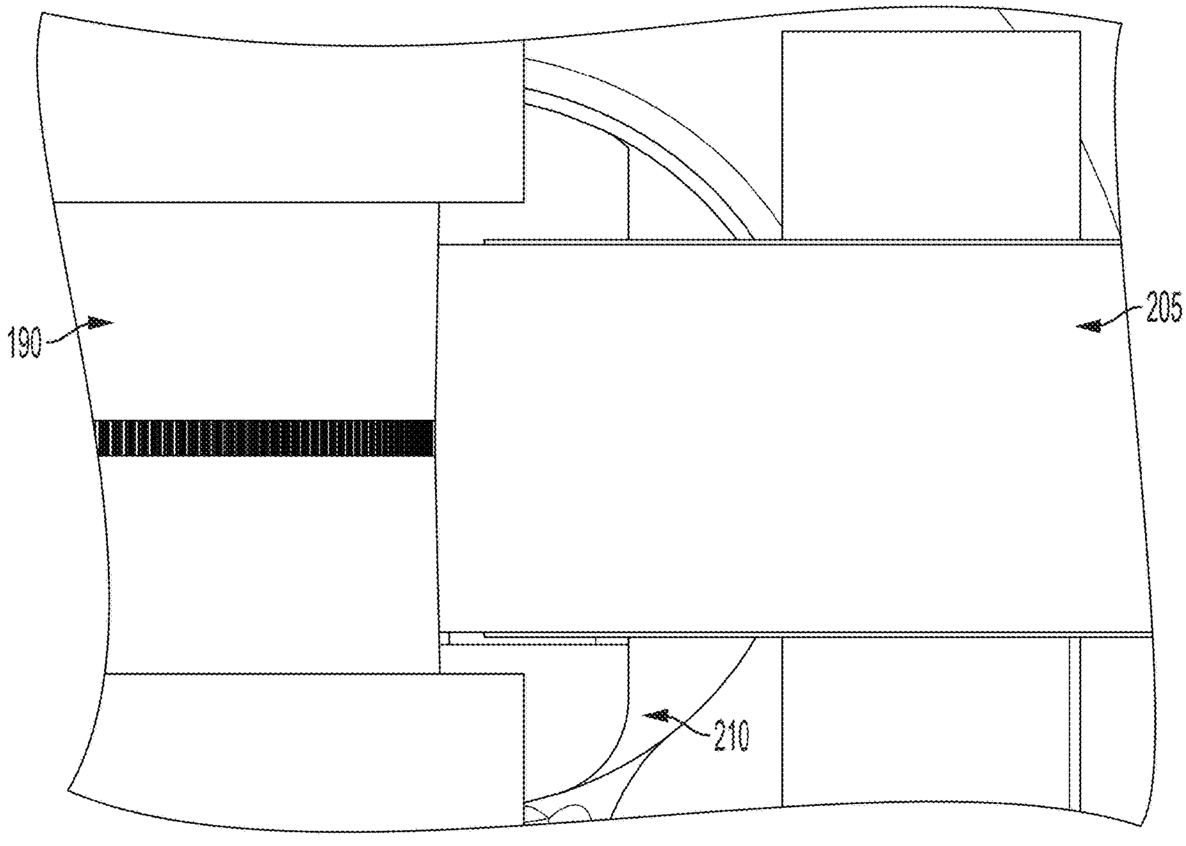
FIG. 8B shows a top view of this other implementation of the strand extruder with a coated idler bearing and the tensioner arm removed.
Figure 8C:
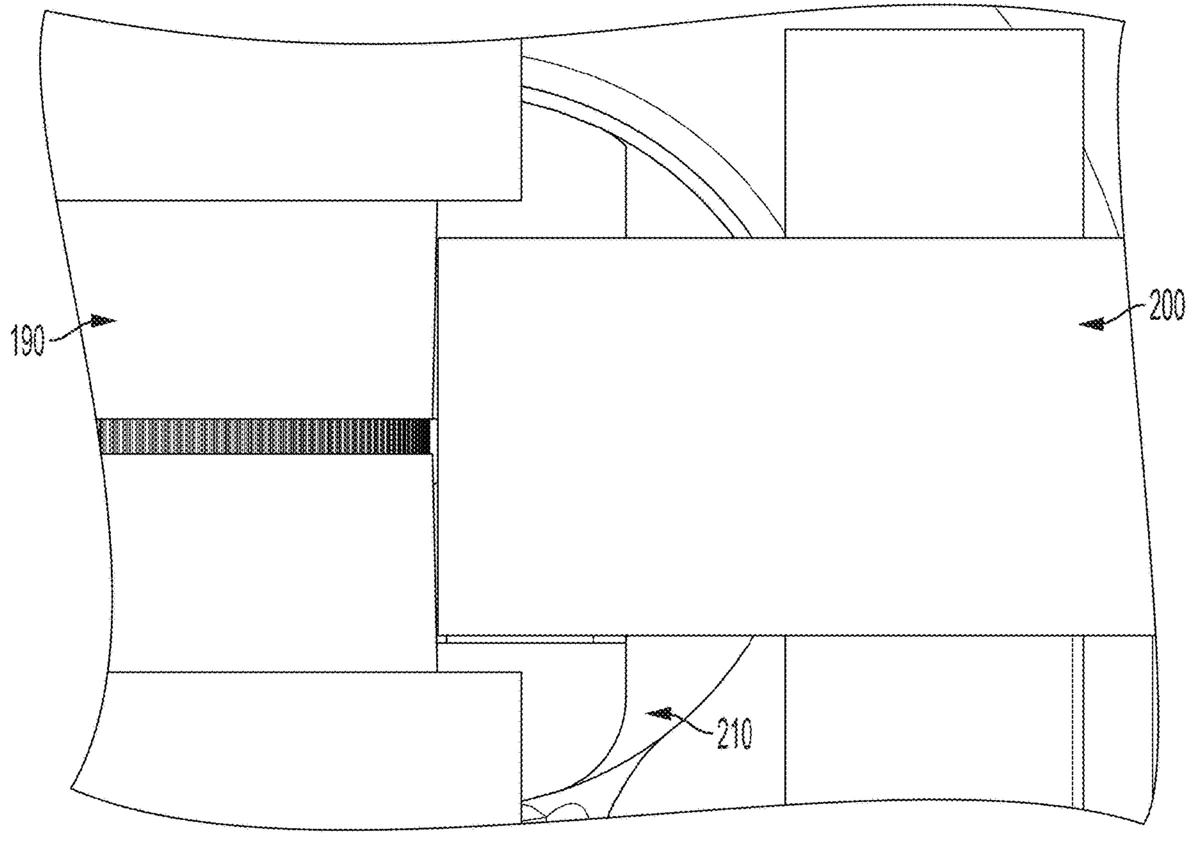
FIG. 8C shows a top view of this other implementation of the strand extruder with a standard idler bearing and the tensioner removed.

As shown in FIG. 8A, the idler bearing 200 may be made of, or coated with, a non-rigid material such as urethane 205. In this implementation, similar to the implementation shown in FIGS. 3A and 3B, the non-rigid material 205 conforms to the drive wheel's centering and gripping features 192, 194 to grip the strand more effectively than a purely-rigid (e.g., stainless steel) idler bearing 200. Further, the drive wheel 190 may be made of, or coated with, a non-rigid material such as urethane 195. In this embodiment, the drive wheel 190 may or may not have discrete centering, gripping, and fencing features 192, 193, 194, as the non-rigid drive wheel 195, in combination with an idler bearing made of rigid 200 or non-rigid 205 materials, effectively grips the strand being extruded without these features 192, 193, 194. This is shown in FIG. 8B and FIG. 8C with a top-down view of the strand extruder 10 with the tensioner arm 120 removed; FIG. 8B shows a urethane-coated idler bearing 205 that conforms to the drive wheel 190 to more effectively center and grip the strand, while FIG. 8C shows a rigid idler bearing 200 with a variable gap between the drive wheel 190 and idler bearing 200.

Figure 9A:
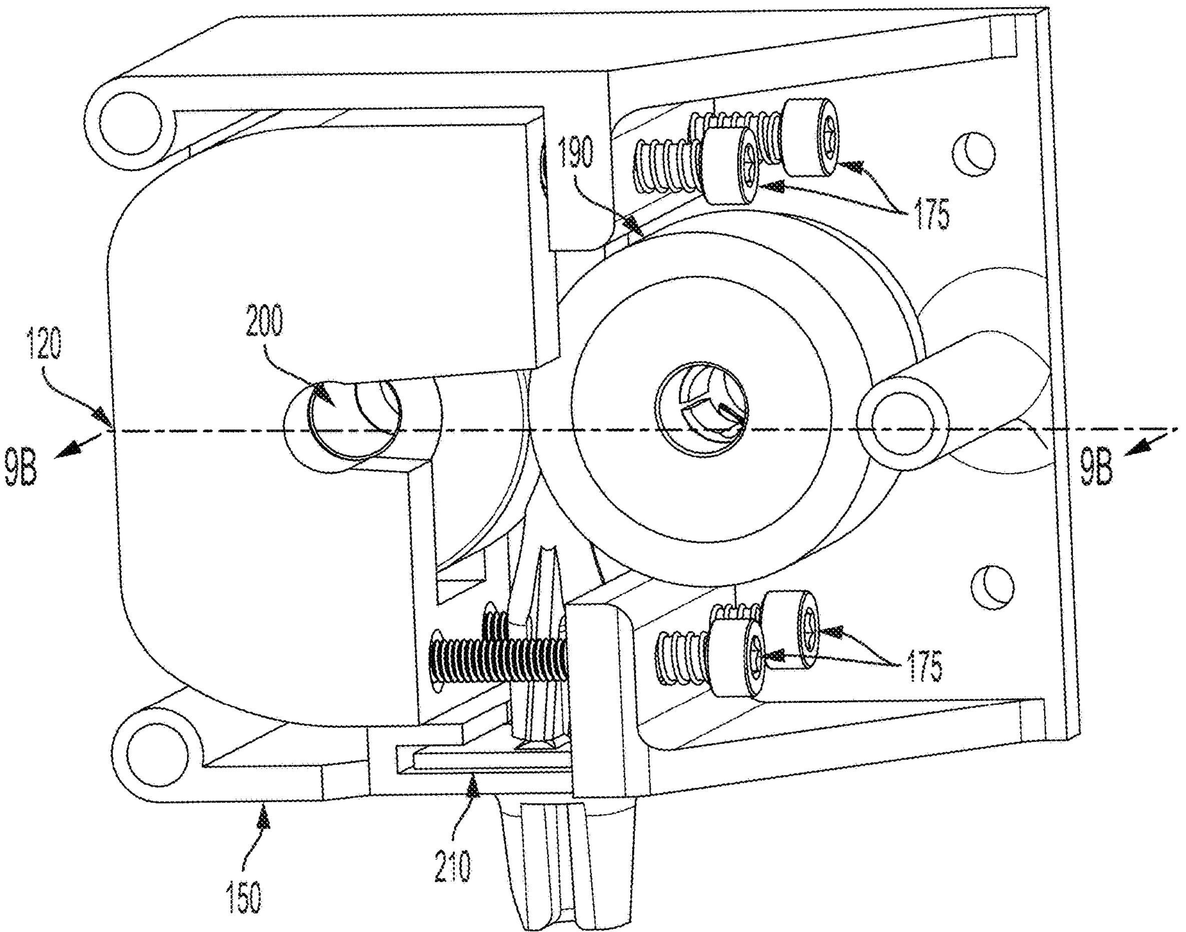
FIG. 9A shows this other implementation of the strand extruder where the tensioner arm is tensioned linearly such that the idler bearing moves linearly instead of rotationally.
Figure 9B:
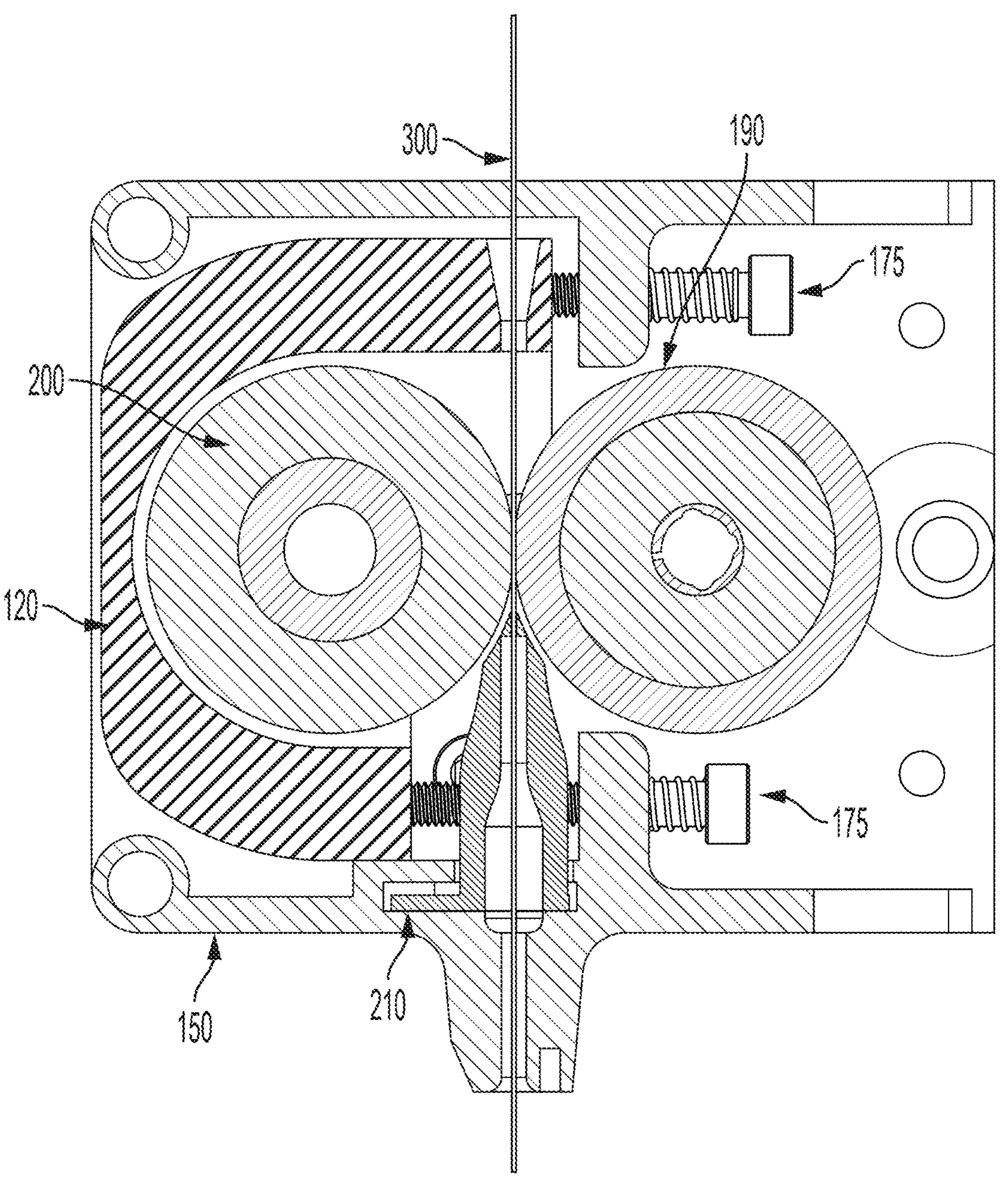
FIG. 9B shows a frontal section view of the strand extruder implementation where the tensioner arm is tensioned such that the idler bearing moves linearly instead of rotationally.

In another implementation, the tensioner arm 120 may not pivot around a single point while being tensioned by a single spring 170. FIG. 9A and FIG. 9B shows one possible implementation where the tensioner arm 120 is tensioned by four independent screws with tension springs attached 175. In this implementation, the tensioner arm 120 does not pivot around a point, and instead can be tensioned directly perpendicular to the strand's path 300. By tensioning perpendicular to the strand's path 300, the apparatus can effectively tension a wider range of strand diameters by eliminating the arc that is inherent to a pivoting tension arm 120 that results in a variable gap between the idler bearing 200 and guide tube 210.

In yet another implementation, the strand extruder's body 150 can contain a side slot (depicted as 225 in FIG. 8A) to allow for the elimination of a separate adapter 220 to allow the strand to be loaded and lock the guide tube in place.

In yet another implementation, the adapter bracket 60 can act as the front cover for the strand extruder to eliminate the discrete strand extruder front cover 130, as depicted in FIG. 7.

The previously described implementations within of the present disclosure have many advantages, including, vitally, the ability to extrude thin strands (0.003"-0.01") with or without co-extruding a matrix material. This ability can be leveraged to extrude bare strand sections, or for use with a matrix that does not cure, dry, or otherwise solidify shortly after deposition (e.g., a ceramic paste).

While we have shown and described several implementations in accordance with the disclosure, it should be understood that the same is susceptible to further changes and modifications without departing from the scope of the disclosure. It should also be noted that the described implementations are understood to be not mutually exclusive, and features from different described implementations can generally be combined together. Therefore, we do not want to be limited to the details shown and described herein but intend to cover all such changes and modifications as are encompassed by the scope of the appended claims.

What is claimed is:

1. An apparatus for the fabrication of a structure formed from a strand embedded matrix, comprising:

a motor attached to a housing and having a shaft extending therefrom and the shaft having a motor-connected gear attached thereto and a tensioner arm rotating about the shaft, the tensioner arm containing an idler bearing, and a tensioner spring in compression between the housing and the tensioner arm;

a strand extruder having a centering guide to center a strand as the strand enters the strand extruder, a drive gear, and a drive wheel, wherein the drive gear is geared to the motor-connected gear, the drive wheel is connected to the drive gear and the drive wheel centers and grips the strand under tension provided by the idler bearing pressing against the drive wheel and strand, due to the tensioner spring pressing against the tensioner arm and idler bearing toward the drive wheel, is feed into a strand injector; and the strand injector having separate chambers for the strand and a matrix and a nozzle for dispensing at least one of the strand alone, a combination of the strand and the matrix, and the matrix alone.

2. The apparatus of claim 1, wherein the drive wheel further comprises:

a groove, two chamfers, and two sidewalls, wherein the groove is between the two chamfers and the two chamfers are between the two sidewalls.

3. The apparatus of claim 2, wherein the structure formed from a strand embedded matrix contains bare strand sections.

4. An apparatus for the fabrication of a structure formed from a strand embedded matrix, comprising:

a motor attached to a housing and having a shaft extending therefrom and the shaft having a motor-connected gear attached thereto and a tensioner arm attached to the housing, the tensioner arm containing an idler bearing, and a tensioner spring in compression between the housing and a head of a fastener to apply tension between the idler bearing and a drive wheel;

a strand extruder to center a strand as the strand enters the strand extruder, a drive gear, the drive wheel, and a tube, wherein the drive gear is geared to the motor-connected gear, the drive wheel is connected to the drive gear and the drive wheel centers and grips the strand under tension provided by the idler bearing pressing against the drive wheel and strand, due to the tensioner spring pressing against the tensioner arm and idler bearing toward the drive wheel, is feed into the tube; and a strand injector having separate chambers for the strand and a matrix and a nozzle for dispensing at least one of the strand alone, a combination of the strand and the matrix, and the matrix alone.

5. The apparatus of claim 4, wherein the drive wheel further comprises:

a groove, two chamfers, and two sidewalls, wherein the groove is between the two chamfers and the two chamfers are between the two sidewalls.

6. The apparatus of claim 5, wherein the structure formed from a strand embedded matrix contains bare strand sections.

7. The apparatus of claim 6, wherein the strand injector further comprises:

a centered support running the length of the strand injector to support the tube within the nozzle and to prevent the matrix from flowing up to the strand extruder.

* * * * *